Aug. 16, 1932. J. H. DE IONGH 1,872,420
COUNTERBALANCING AND INDICATING MECHANISM FOR WEIGHING APPARATUS
Filed April 30, 1930

Inventor:
Johan H. de Jongh,
By Chas. M. Nissen,
Atty.

Patented Aug. 16, 1932

1,872,420

UNITED STATES PATENT OFFICE

JOHAN HENDRIK DE IONGH, OF WASSENAAR, NETHERLANDS, ASSIGNOR TO NAAM-LOOZE VENNOOTSCHAP MAATSCHAPPIJ TOT VERAARDIGING VAN SNIJMACHINES VOLGENS VAN BERKEL'S PATENT EN VAN ANDERE WERKTUIGEN, OF ROTTERDAM, THE NETHERLANDS, A LIMITED LIABILITY COMPANY, THE NETHERLANDS

COUNTERBALANCING AND INDICATING MECHANISM FOR WEIGHING APPARATUS

Application filed April 30, 1930, Serial No. 448,620, and in Great Britain May 10, 1929.

The present invention relates to weighing apparatus of the type in which a pair of load counterbalancing devices are adapted to resist the movement of an actuating rod.

In such an apparatus, the load counterbalancing devices are generally capable of movement relatively to each other and the movement of the load counterbalancing devices is proportional or approximately proportional to the movements of the actuating rod. Also the indicating means moves approximately proportional to the movements of the counterbalancing devices. As least for all practical purposes the indicating means moves generally through equal increments for each additional unit load placed upon the weighing apparatus.

Generally the movement is imparted to the indicating means through eccentric or non-circular sectors which are adjustable relatively to other sectors or a pendulous weight. This adjustment of the sectors relatively to other sectors or to a pendulous weight is rather difficult and in most cases involves a complicated construction which is necessary for securing it against displacement.

One object of this invention therefore is to provide a simplified construction for giving the same effect as the above described apparatus.

Accordingly this invention contemplates providing an adjustable connection between the load counterbalancing devices and the indicating means. This adjustable connection permits relative adjustment between the load counterbalancing devices and an indicating means to thereby position the indicating means independently of the load counterbalancing devices.

A more specific object of my invention is to provide an indicating means which will permit adjusting the course of the indicating means without changing the total movement imparted to the indicating means. In other words, the indicating means may be adjusted independently of the position of the load counterbalancing device or devices.

In order that my invention may be more clearly understood and carried into practice, a practical embodiment thereof will now be described by way of example, reference being made to the accompanying drawing in which—

Figure 2:
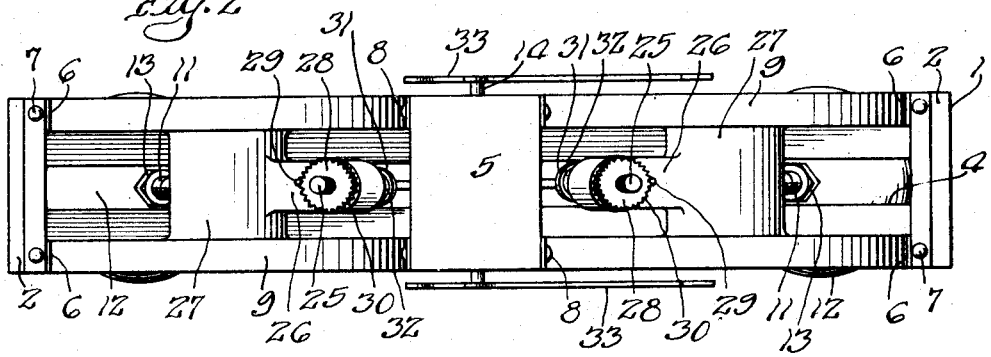
Figure 1:
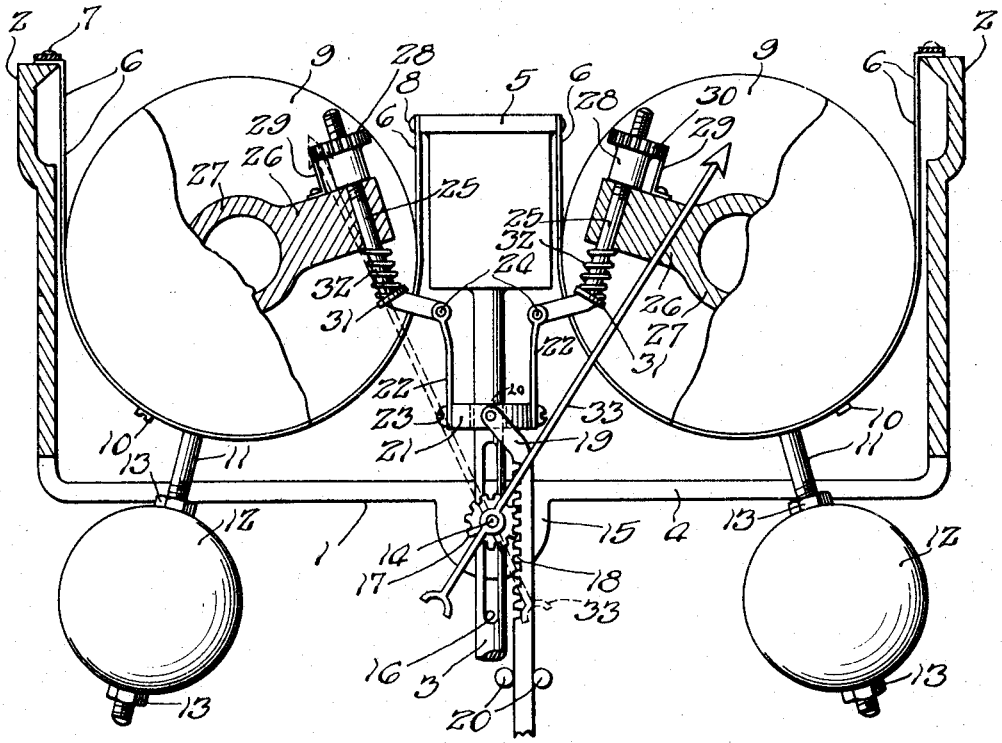

Fig. 1 is a front elevational view of a load counterbalancing and indicating means for a weighing apparatus; and Fig. 2 is a plan view thereof.

Referring more particularly to Fig. 1, the reference numeral 1 represents a frame member substantially U-shaped in cross section having the upwardly extending arms 2 arranged at opposite sides thereof. An actuating rod 3 normally movable vertically in an upward direction when a load is placed on the load platform (not shown) extends upwardly through an opening 4 in the cross member of the U-shaped member 1. The upper part of the actuating rod 3 carries a head 5. Flexible bands 6 are connected at 7 and 8 to the arms 2 and the head 5 respectively. These flexible bands 6 are trained around the spool shaped members 9 and support the same, the flexible bands being secured to the spool shaped members by means of suitable fastening means such as the screws 10.

It will be seen that from this arrangement as the actuating rod 3 moves upwardly the members 9 will rotate in such a direction that the upper peripheries thereof will move towards the arms 2. Each of the rotatable members 9 has an arm 11 which carries a pendulous weight 12 adjustably mounted thereon and held in place by the lock nuts 13. With the parts in the position shown, the centers of gravity of the pendulous weights are located very near to the points of support for the flexible bands 6 on the arms 2. However, when the actuating rod 3 moves vertically the members 9 rotate as previously described and thus cause the pendulous weights 12 to move towards the actuating rod and as the pendulous weights move towards the actuating rod an increasing percentage of the weight thereof is carried by the actuating rod, and thus a greater resistance is offered to the movement of the actuating rod 3.

The indicating means and actuating means therefore comprise a rotatable shaft 14, journaled in the downwardly extending ears 15 on the frame member 1. This rotatable shaft extends through a slot 16 in the actuating rod 3, or it may be so arranged that the shaft need not pass through the actuating rod as it is possible to use a short stub shaft for the same purpose as the shaft 14. The shaft 14 has a gear 17 secured thereto, and this gear meshes with a rack 18 guided by means of collars 20 in a vertical path. It will be understood, of course, that any other desirable means may be used to guide the rack 18, the collars 20 merely being shown for illustrative purposes.

The upper end of the rack has an offset portion 19 pivoted at 20 to a leveling or distributing member 21. This leveling or distributing member has secured thereto the springs 22 by means of the screws 23. The springs in turn are pivotally connected at 24 to the rods 25 which pass through outwardly extending lugs 26 on the hub 27 of the spool shaped members 9. Each of the rods 25 is screw threaded at its free end, and a nut 28 is threaded on the screw threaded portion of the rod. In order to prevent accidental rotation of the nuts 28, I provide springs 29 secured to the lugs 26 which springs are adapted to engage the serrated peripheries 30 of the nuts 28. The springs however, do not necessarily prevent manual adjustment of the nuts along the rods 25. In order to hold the nuts 28 against the lugs 26 I provide the rods with collars 31 and springs 32 which surround the rods are interposed between the collars 31 and the lugs 26.

Normally therefore, the rods 25 move in unison with the lugs 26, and consequently when the actuating rod 3 is moved upwardly, the pivots 24 move upwardly and cause the leveling or distributing member 21 to move in that same direction. The upward movement of the leveling or distributing member 21 carries the rack 18 along with it, and this causes a counter-clockwise movement of the gear 17. The shaft 14 to which the gear 17 is secured also carries an indicating pointer 33 which co-operates with a suitable indicating scale (not shown) in a manner which is well known in the art to which this invention pertains, thereby indicating the weight of the article being weighted by the apparatus.

By rotating the nuts 28, I am able to change the vertical position of the leveling or distributing member 21 independently of the rotatable members 9. This adjustment of the leveling or distributing member changes the position of the pointer 33 through the intermediary of the rack and pinion previously described. The total movement of the pointer 33 however, remains the same when actuated by the pendulous weights but the course or path of movement of the pointer is varied.

With the arrangement which has just been described, it will be noted that the rotatable members 9 as well as the pendulous weights 12 are free to move laterally, and so is the distributing member 21. However, the springs 22 do not resist the lateral movement of the leveling or distributing member 21 sufficiently to affect the accuracy of the weighing mechanism but merely act as a means to dampen the movement of the indicating means.

It will be noted that the load counterbalancing devices are duplicated, like parts being mounted on both sides of the common leveling or distributing member. Upon turning both of the nuts 13 the same amount, the point of connection between the rods 25 and the distributing member 21, the distributing member is moved into a position parallel with the position previously occupied thereby. However, the positions of the counterbalancing devices remain the same. Therefore, for the same movement of the pendulous weights, I will obtain the same extent of movement of the indicating means, but the course or the path over which the indicating means moves is changed whenever the nuts 28 are adjusted to change the position of the leveling or distributing member 21.

It will be noted that I have used springs 29 for resisting rotation of the nuts 28 but it will be understood that any other means may be used for resisting the rotation of the nuts 28.

My invention has the advantage of enabling one to adjust the points of connection between the load counterbalancing devices and the indicating means without disturbing the position of the load counterbalancing devices thereby effecting a saving of time since with the method now employed, adjustment of the indicating means requires adjustment of the counterbalancing device also. In order to enable me to get the best results, the points of connection between the springs 22 and the rods 25 should move relatively to the pendulous weights in substantially curved path which within practical limits may approximate to a straight line which generally subtends a small angle to the tangential line of the respective sector. Alternately the said curved path may approximate a circle in which case the point of connection may turn in its plane about a fixed point of the sector. This adjustment is of great importance in the case of pendulums with concentric circular sectors.

Having thus described a preferred embodiment of my invention what I desire to secure by Letters Patent of the United States is:

1. Weighing apparatus comprising pendulous weights, indicating means, a member movable with each of said pendulous weights, a rod passing through an opening in each of said members and adjustable longitudinally in said openings, and means for connecting said rods to said indicating means.

2. Load counterbalancing and indicating means comprising rotatable members carrying pendulous weights, rods adjustably mounted on said rotatable members, and indicating means connected to said rods and movable thereby.

3. Weighing apparatus comprising fixed and movable members, flexible elements attached to said fixed and movable members respectively, said rotatable members being movable in response to loads placed on the weighing apparatus, means for resisting rotation of said movable members when said movable member is actuated, indicating means operatively connected to said rotatable members, and adjustable means for connecting said indicating means and movable members, said adjustable means comprising a member operatively connected to the indicating means and adjustably held against movement relative to said rotatable members by means of a spring which resists movement of said member in one direction and an abutment which resists movement thereof in the opposite direction.

4. A device as claimed in claim 3 in which the abutment is adjustable relatively to said member.

5. Weighing apparatus comprising pendulous weights, rods adjustably mounted with respect to said pendulous weights and operatively connected to a leveling or distributing member, indicating means connecting to said leveling or distributing member and means for actuating said pendulous weights to impart movement to said indicating means through said pendulous weights.

6. In a weighing apparatus, the combination with an actuating rod, a support, a rotatable member, a weight connected to said rotatable member, a flexible element connected to said rotatable member and to said support, a flexible element connected to said rotatable member and said actuating rod, said rotatable member and weight being entirely supported by said flexible connections to said support and actuating rod, indicating means, a member for actuating said indicating means, an adjustable connection between said indicating means and said rotatable member comprising an adjustable screw for changing the length of the connection between said rotatable member and the member for actuating the indicating means while permitting lateral movement between said member which actuates said indicating means and said rotatable member.

7. In a weighing apparatus, the combination with a support, an actuating rod, rotatable members interposed between said actuating rod and portions of said support, a flexible element secured to each rotatable element and to said support and actuating rod so that movement of said actuating rod will move said rotatable elements, means for resisting rotation of said rotatable elements, said means being supported thereby and said rotatable elements being wholly supported by said flexible elements, lugs extending upwardly from the centers of rotation of said rotatable members, threaded rods freely extending through said lugs, adjustable nuts threaded on said rods, means for holding said nuts in adjusted position, springs for holding said nuts against said lugs, indicating means and operative connections between said indicating means and said threaded rods for actuating said rotatable elements.

In testimony whereof I have signed my name to this specification on this sixteenth day of April A. D. 1930.

JOHAN HENDRIK de IONGH.